US008001884B2

(12) United States Patent
Böttger

(10) Patent No.: US 8,001,884 B2
(45) Date of Patent: Aug. 23, 2011

(54) SWIVEL MOTOR

(75) Inventor: Christian Böttger, Frensdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 538 days.

(21) Appl. No.: 12/203,246

(22) Filed: Sep. 3, 2008

(65) Prior Publication Data

US 2009/0056533 A1 Mar. 5, 2009

(30) Foreign Application Priority Data

Sep. 3, 2007 (DE) ......................... 10 2007 041 610

(51) Int. Cl.
*F15B 15/12* (2006.01)
*F16L 55/04* (2006.01)

(52) U.S. Cl. ............................. 92/85 R; 92/143; 92/120

(58) Field of Classification Search .................. 92/85 A, 92/85 B, 85 R, 120, 122, 143
See application file for complete search history.

(56) References Cited

U.S. PATENT DOCUMENTS

| | | | | |
|---|---|---|---|---|
| 6,405,845 | B1 * | 6/2002 | Muller et al. | 192/30 V |
| 6,880,451 | B2 * | 4/2005 | Beilner et al. | 92/121 |
| 7,231,865 | B2 * | 6/2007 | Wehaus et al. | 91/422 |

FOREIGN PATENT DOCUMENTS

| | | | |
|---|---|---|---|
| DE | 101 40 460 | C1 | 3/2003 |
| DE | 10 2004 039 767 | A1 | 3/2006 |
| DE | 10 2004 051 444 | A1 | 4/2006 |
| EP | 1 085 249 | A2 | 3/2001 |

* cited by examiner

*Primary Examiner* — Thomas E Lazo
(74) *Attorney, Agent, or Firm* — Cohen Pontani Lieberman & Pavane LLP

(57) ABSTRACT

A swivel motor has a plurality of work chambers and a join system between the work chambers that joins the work chambers at least by pairs. The arrangement of the joined work chambers is carried out in such a way that the work chambers which are connected to the first pressure medium connection alternate with those which are connected to the second pressure medium connection. At least two work chambers associated with different pressure medium connections are connected to a pressure compensation element, and the pressure compensation element is formed by a compensation space that is divided by a movable dividing element. A partial compensation space is connected in each instance to at least one work chamber of a pressure medium connection, and the dividing element is held in an initial position by oppositely acting springs. The spring force characteristic is formed by a spring arrangement which comprises a plurality of springs and has at least one coil spring and one elastomer spring. At least one volume compensation space is available for the elastomer spring.

11 Claims, 4 Drawing Sheets

SWIVEL MOTOR

BACKGROUND OF THE INVENTION

1. Field of the Invention

The invention relates to a swivel motor and particularly to a unit actuated by pressure medium.

2. Description of the Related Art

Pressure medium-actuated units are generally used to support a structural component part in an operating movement. In such cases, the structural component part can be subject to an external load. In a unit that is constructed as a swivel motor, in a vehicle chassis, a stabilizer arrangement can execute a swiveling movement but, due to deflection of the wheels of one axle, the swivel motor is exposed to a load of an appreciably higher frequency than the rocking movement of a vehicle body pressure changes in the pressure-medium supply.

In DE 10 2004 051 444 A1 pulsing of the pressure medium is discussed and by way of a solution a foam body is arranged in at least one work chamber of the unit. The foam body has at least one disadvantage in that the operating path of the unit is restricted. Further, it must be ensured that no decomposition occurs over the life of the unit which would release particles from the foam body that would clog the unit or the pressure supply system.

DE 10 2004 039 767 A1 discloses a swivel motor comprising a cylinder with ribs extending axially at the inner diameter, which cylinder is closed at the ends by two covers, a motor shaft with vanes having the same axial extension as the ribs of the cylinder, wherein the vanes of the motor shaft and the ribs of the cylinder, together with the cylinder, covers and motor shaft, form individual work chambers, a first and a second pressure medium connection for two work chambers separated in each instance by a rib, a join system between the work chambers which joins work chambers at least by pairs. The arrangement of the connected work chambers is carried out in such a way that the work chambers which are connected to the first pressure medium connection alternate with those connected to the second pressure medium connection, and at least one work chamber is connected to a pressure compensation element. The pressure compensation element is formed by a pressure limiting valve which opens in a direction of the work chamber with the lower working pressure so that pressure medium can overflow from at least one work chamber of a first group into a work chamber of the second group.

The pressure limiting valve opens as a function of the difference in pressure between two work chambers. As a result of a deflecting movement of the wheel, a first work chamber can be discharged and the adjacent chamber compressed. When the pressure falls below a differential pressure, the pressure limiting valve opens even though the working pressure in the compressed work chamber has not yet reached a critical value. In the pressure limiting valve, the opening behavior cannot be different between permissible peak pressures in the compressed work chamber and an instantaneous differential pressure between two adjacent work chambers.

Another proposed solution according to DE 101 40 460 C1 discloses a unit operated by pressure medium that is connected to an external air cushion which is intended to prevent cavitation in a work chamber.

Publication DE 10 2007 009 592 A1 proposes a unit that has a slide element as a pressure compensation element. This slide element controls a system between work chambers in order to counteract peak pressures in the unit due to volume displacement of pressure medium. The slide element cooperates with elastomer springs which are supposed to suppress an impact noise in the swivel motor shaft. However, trials have shown that the elastomer spring is very highly loaded and, as a consequence, is destroyed in some cases.

SUMMARY OF THE INVENTION

It is an object of the present invention to prevent the impact noise at a slide element in a swivel motor actuated by a pressure medium and, in so doing, to prevent the resulting destruction of the elastomer springs.

In one embodiment, the elastomer spring can expand at increased temperatures, and the growth in volume is absorbed by the volume compensation space. The elastomer spring retains its given bias and does not spring out of its installation space in an indefinite manner.

In one embodiment, the volume compensation space is formed annularly coaxial to the elastomer spring. Consequently, a space corresponding to the body shape of the elastomer springs is made available to the elastomer springs and no partial tension peaks occur.

An advantage is that the volume compensation space is formed by a neck in the profile of the elastomer spring. Generally, the installation space for the elastomer spring could also be profiled, but the manufacturing cost would be very high. In an elastomer spring produced by injection molding, profiling can be implemented in a very simple manner.

In one embodiment, a plurality of volume compensation spaces are formed on the circumference of the elastomer spring. This results in a uniform tension distribution in the elastomer spring.

In one embodiment, an elastomer spring is an O-ring.

A fastening groove having at least one groove side surface extending conically with respect to the center axis of the pressure compensation element is provided for fixing the elastomer spring. Apart from the especially simple fixing of the elastomer spring, another effect is achieved in that pressure medium can flow in between the elastomer springs and the fastening groove and can be pressed out via the volume compensation spaces during a compression of the elastomer springs so that a hydraulic pressure force is developed which additionally dampens the movement of the pressure compensation element.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
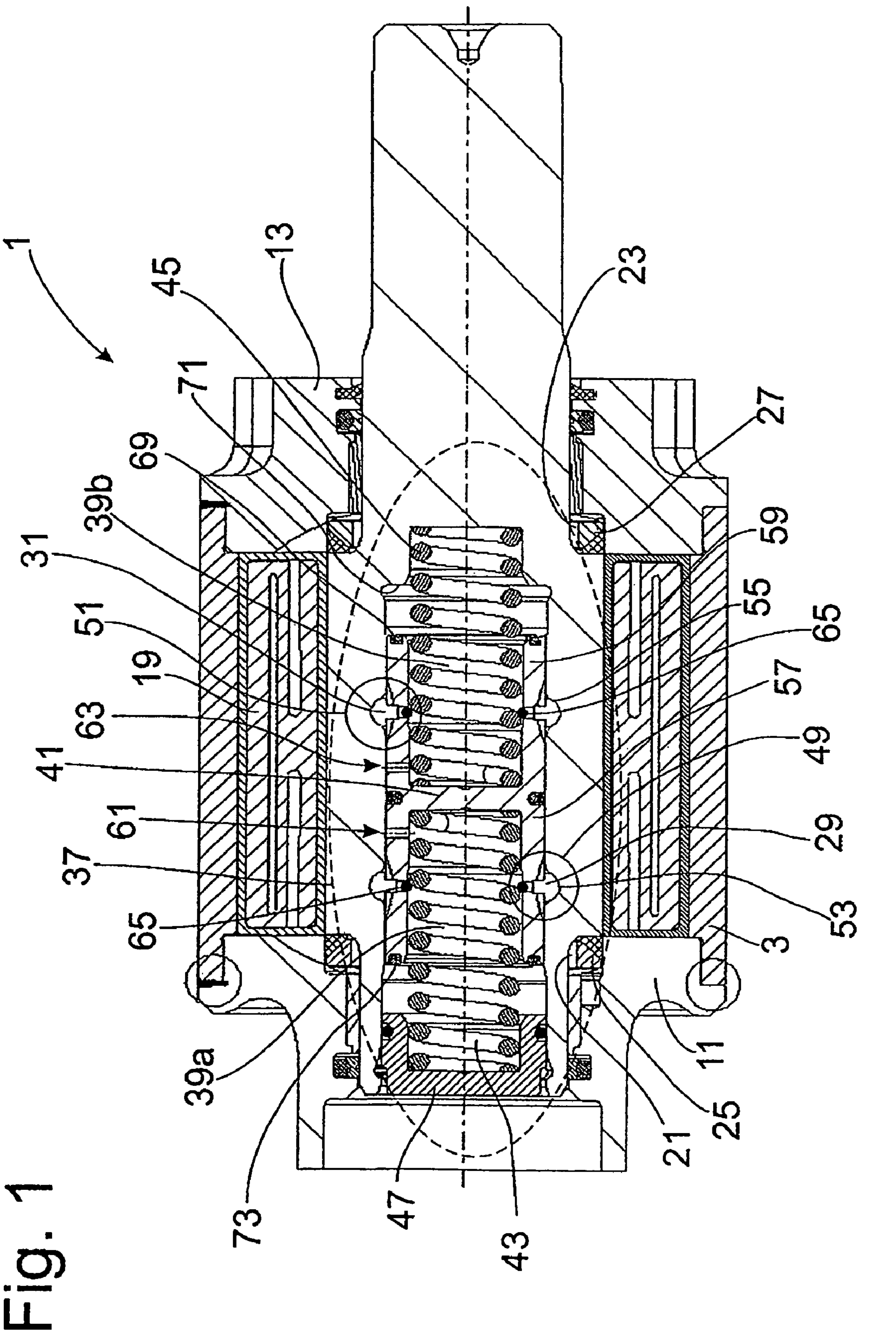
FIG. 1 depicts a longitudinal section through a swivel motor unit in the region of the work chambers according to an embodiment of the invention.
Figure 2:
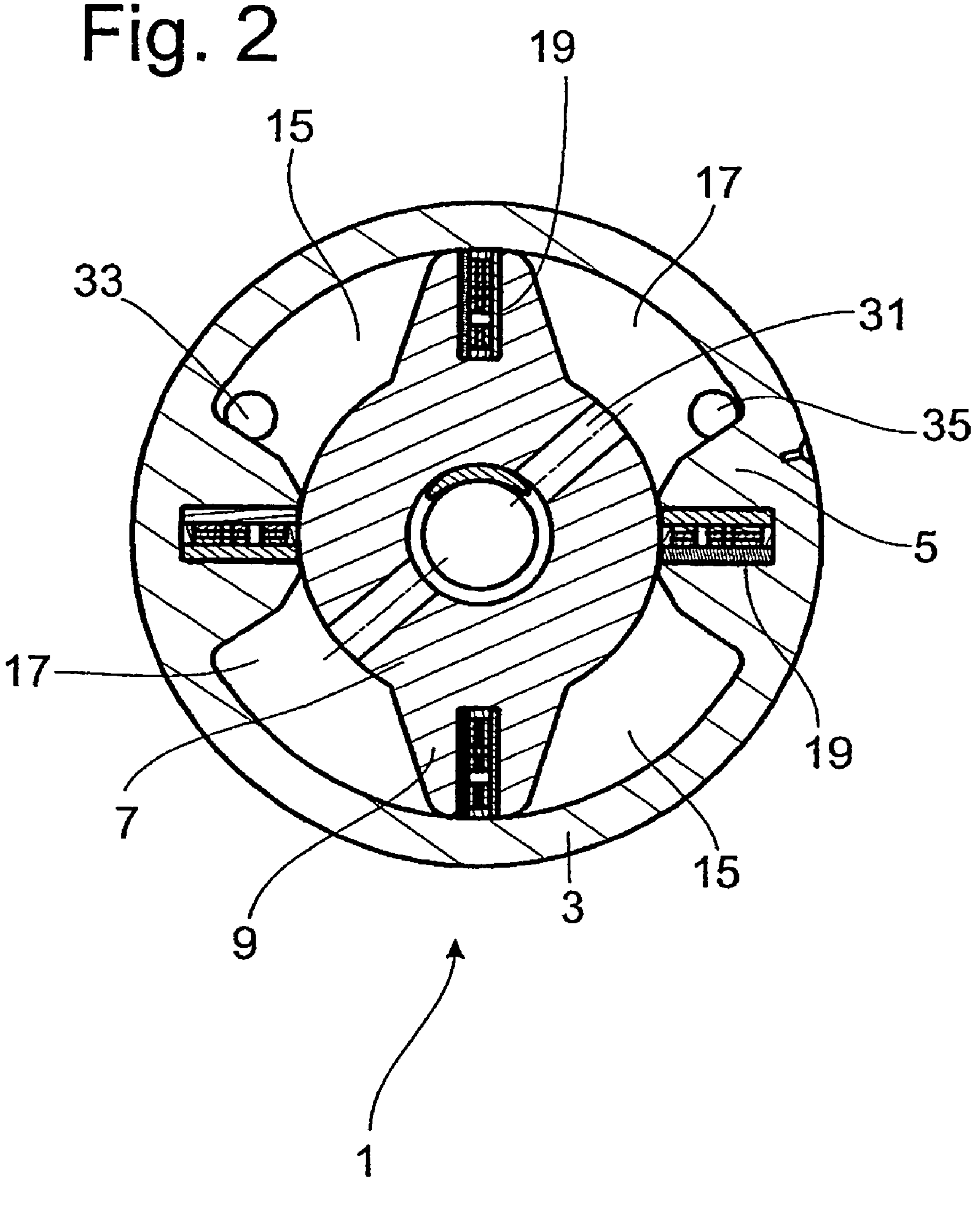
FIG. 2 depicts a cross section through the unit of FIG. 1 in the region of the pressure compensation element.

FIG. 1, in connection with FIG. 2, shows a swivel motor 1 in longitudinal section. This basic construction is also assumed in the following drawings. The swivel motor 1 comprises a cylinder 3, axially extending ribs 5 being formed at its inner diameter. A motor shaft 7 is supported inside the cylinder 3 so as to be rotatable. Vanes 9 extending parallel to the ribs 5 are arranged on the motor shaft. The cylinder 3 is closed by covers 11 and 13 at the ends. The motor shaft 7 with its vanes 9 and the cylinder 3 with its ribs 5 together with the covers 11 and 13 form work chambers 15 and 17 which are separated from one another by disk seals 19 in the vanes and ribs. Further, shaft seals 25 and 27 are arranged in the annular spaces 21 and 23 of the covers 11 and 13 and prevent pressure medium from exiting the work chambers 15 and 17. Between the work chambers 15 and 17, there is a join system comprising channels 29 and 31 in the motor shaft 7. A first pressure medium connection 33 supplies work chamber 15 via channel 29 and a second pressure medium connection 35 carries out this function for work chamber 17 via channel 31. The same pressure level prevails in the connected work chambers. Because of the pressure medium flowing in and out of the work chamber 15, 17 via the pressure medium connections 33 and 35, the swivel motor exerts a torque, in one embodiment is used to adjust a divided stabilizer inside a chassis for a motor vehicle.

A pressure compensation element 37 formed by a compensation space that is divided into two partial compensation spaces 39*a* and 39*b* by a movable dividing element 41 serves to absorb the jumps in pressure that occur in the work chambers 17 and 19 due to higher-frequency external loads. Partial compensation space 39*a* is connected to a work chamber group 15 of a pressure medium connection 33 and partial compensation space 39*b* is connected to the work chamber group 17 of the pressure medium connection 35.

The dividing element 41 is formed by a slide with a disk-shaped base body and is held in its starting position by opposing springs 43 and 45. The compensation space is arranged at the join system, channels 29 and 31, of the two work chamber groups 15 and 17 inside the motor shaft 7. A seal cover 47 closes the pocket hole that forms the compensation space 39A, 39B in the motor shaft 7. Spring 43 is supported at the cover 47 and spring 45 is supported at the pocket hole.

Channels 29 and 31 end in a lateral surface of the compensation space and their end openings, together with the movable dividing element 41, form slide valves 49 and 51 that carry out an opening and closing movement in opposite directions. Circumferentially extending grooves 53 and 55 are incorporated in the lateral surface and make it possible to connect the work chambers of a work chamber group 15 or 17 even when the slide valve is closed.

The dividing element 41 has sleeve portions 57 and 59 which slide on the lateral surface of the compensation space and cooperate with the end openings of the channels 29 and 31. At least one after-flow opening 61 and 63 is formed at an axial distance from the end face of the sleeve portions 57 and 59 and overlaps with the end opening of the respective channel 29 and 31 in the maximum closing position of the dividing element.

Arranged between the channels 29 and 31, and the respective adjoining partial compensation spaces 39*a* and 39*b* is at least one check valve which is formed by the at least one after-flow opening 61 and 63 in the sleeve portions 57 and 59 of the dividing element 41 that opens in direction of the respective partial compensation space 39A, 39B. The after-flow opening 61 and 63 is closed on the inner side at the sleeve portion 57 and 59 by a pretensioned sealing ring 65.

FIG. 1 shows the dividing element 41 in a middle position when the flow of pressure medium into one work chamber group acts with a corresponding counter-pressure in the other work chamber group in spite of the outflow of pressure medium. Particularly when there is a sudden drop in pressure in one work chamber group, the dividing element 41 executes an axial displacing movement in direction of the base of the pocket hole against the force, e.g., of spring 45. In so doing, a volume of pressure medium corresponding to the cross section of the inner diameter of the compensation space 39*b* multiplied by the displacement path of the dividing element is forced through the annular groove 55 into the channel 31 and accordingly into the work chamber 17 so that no vacuum can occur. A minimum volume in one work chamber group is compensated by the movement of the dividing element in connection with an increase in volume in the other work chamber group in the region of the partial compensation space.

Figure 3:
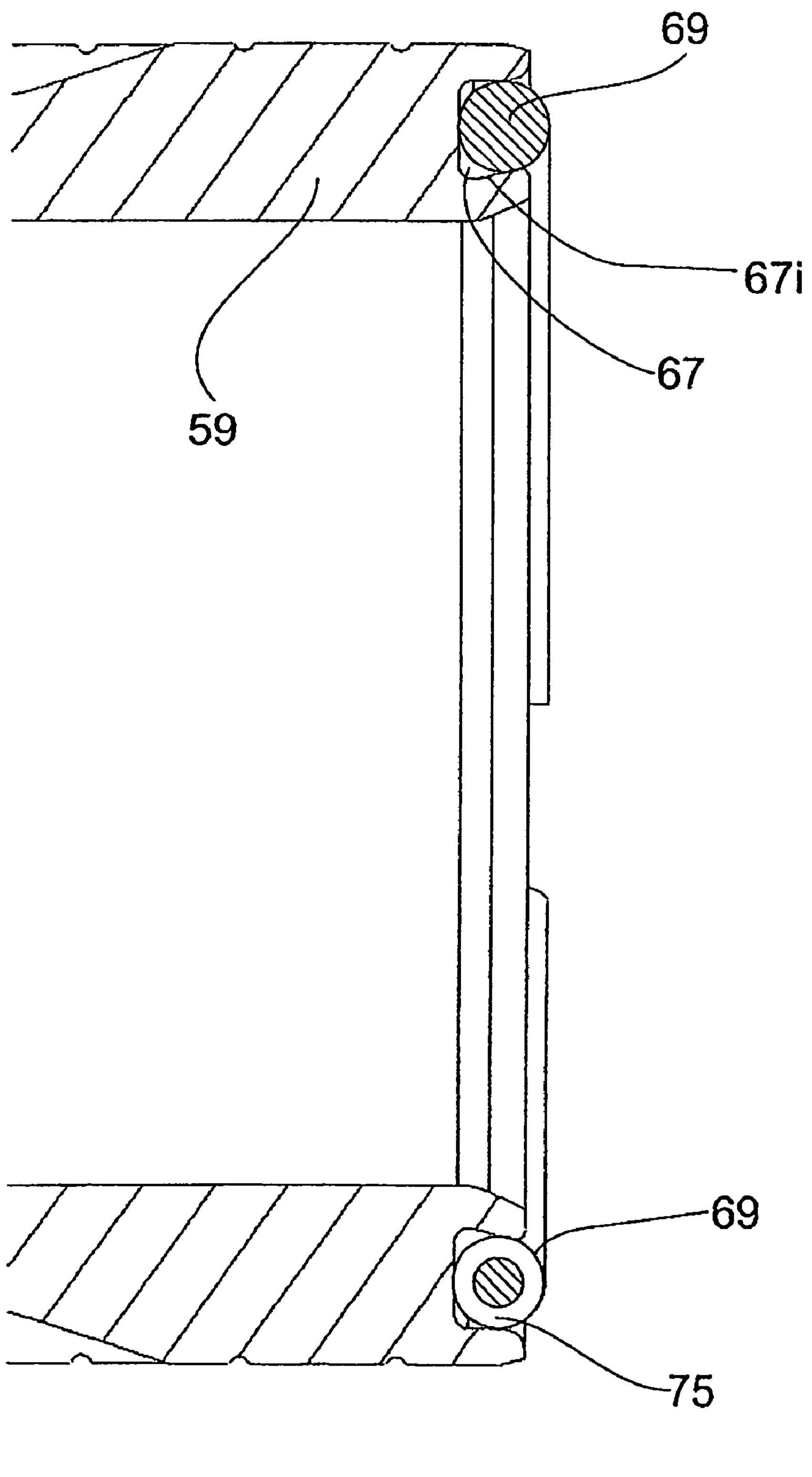
FIG. 3 depicts an elastomer spring in the installed position.

The sleeve portion 59 is configured to run over the annular groove 55 and reduce the transfer cross section between the compensation space 39*a* and the annular groove 55. In so doing, a throttling effect is achieved which prevents an impacting of the dividing element in the motor shaft. Shortly before the end position, the sleeve portion 59 abuts at a shoulder 71 of the motor shaft by a second spring 69 (FIG. 3) which is constructed as an annular elastomer spring and is fixed in a fastening groove 67. The fastening groove 67 has at least one groove side surface 67*i* extending conically in relation to the center axis of the pressure compensation element 37. This groove side surface 67*i* on which the spring 69 is radially biased can receive pressure medium to a limited extent. The elastomer spring, which is constructed as an O-ring, has an appreciably greater spring rate than the coil spring and, after the impact, acts parallel to the coil spring 45.

Figure 4:
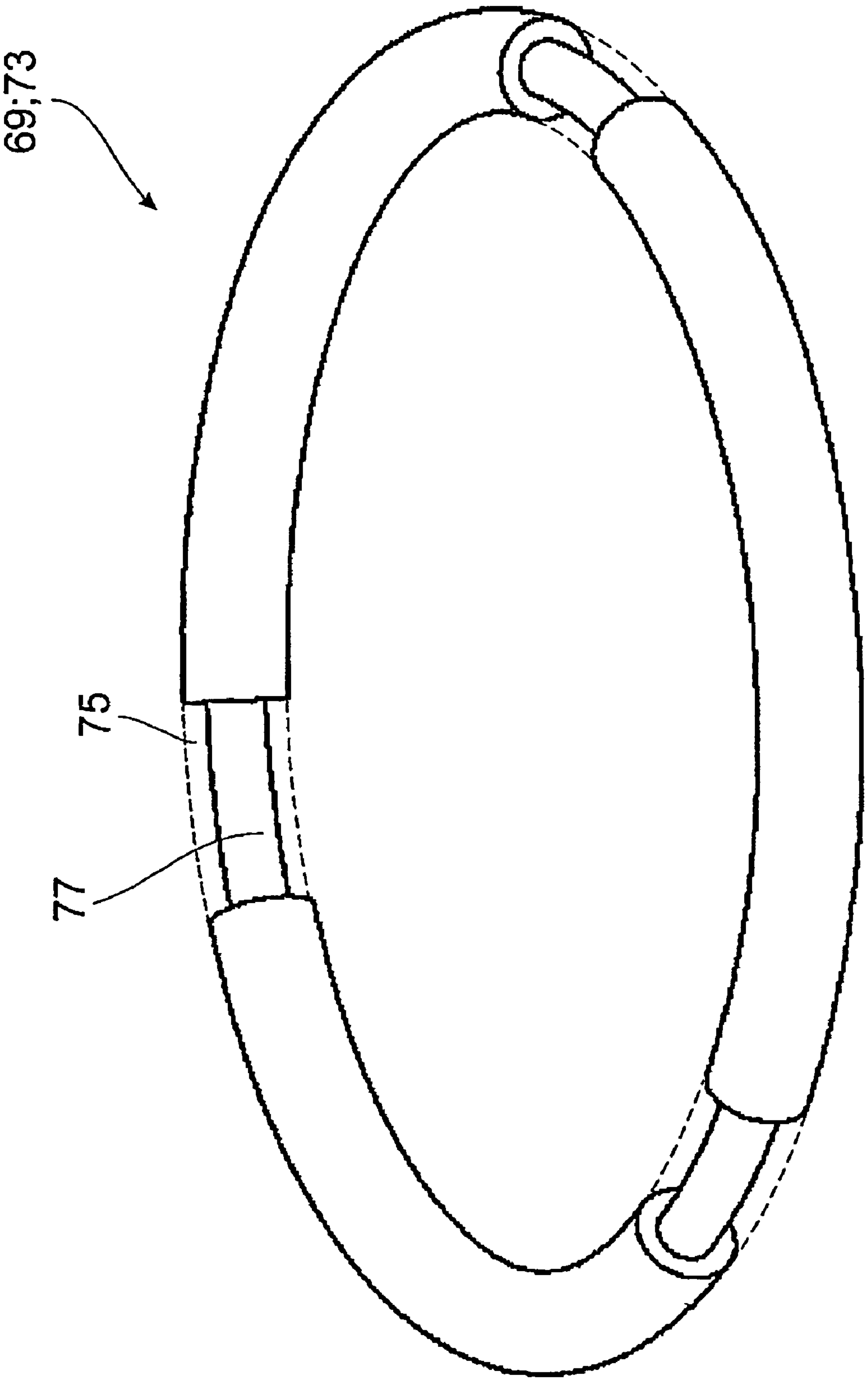
FIG. 4 depicts an elastomer spring as an individual part.

FIG. 4 shows the elastomer spring 69 as an individual part. At least one volume compensation space 75, by which temperature-dependent fluctuations in volume in the elastomer springs are compensated, is provided in the elastomer spring 69, 73. The dashed lines indicate that a plurality of volume compensation spaces 75 for the elastomer springs 69, 73 are constructed coaxial to and in circumferential direction to the elastomer spring. The volume compensation spaces 75 are formed by necks 77 in the profile of the elastomer springs.

The entire spring arrangement comprising the coil spring 45 and the elastomer spring 69 has a progressive spring characteristic. The impact movement of the dividing piston is influenced by the coil springs 43 and 45, the elastomer springs 69 and 73, the throttling action in the volume displacements of pressure medium from the fastening grooves 67, and the throttling action of the slide valves 49 and 51.

In one embodiment, the after-flow opening 63 overlaps the annular groove 55. In one embodiment, an after-flow opening is omitted due to a sufficiently large gap provided between the sleeve portions and the lateral surface of the compensation space.

Due to the different spring forces of the three springs 43, 45, 69 when compensating for the sudden pressure difference, the dividing element 41 can be moved back into the starting position until the spring forces of the two spring arrangements are in equilibrium. The sleeve portion 57 cooperates with an identically constructed O-ring 73 for the opposing compensating movement of the dividing element 41.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A swivel motor, comprising:

a cylinder with ribs extending axially at the inner diameter, the cylinder being closed at the ends by two covers;

a motor shaft with vanes having the same axial extension as the ribs of the cylinder, wherein the vanes of the motor shaft and the ribs of the cylinder, together with the cylinder, covers, and motor shaft, form individual work chambers;

a first pressure medium connection and a second pressure medium connection respectively connected to two of the work chambers separated by a rib;

a joining system adapted to join pairs of the work chambers such that work chambers connected to the first pressure medium connection alternate with work chambers connected to the second pressure medium connection;

a pressure compensation element defining a compensation space and connected to at least two work chambers associated with different ones of he first and second pressure medium connections, the pressure compensation element comprising:

a movable dividing element adapted to divide the compensation space into first and second partial compensation spaces each of the first and second partial compensation spaces being coupled to at least one work chamber respectively of the first and second pressure medium connections;

oppositely acting springs configured to hold the dividing element in an initial position by a spring force characteristic, the springs comprising at least one coil spring and at least one elastomer spring, wherein at least one volume compensation space is provided in the elastomer spring.

2. The swivel motor according to claim 1, wherein the volume compensation space is constructed annularly coaxial to the elastomer spring.

3. The swivel motor according to claim 1, wherein the volume compensation space is formed by a neck in the profile of the elastomer spring.

4. The swivel motor according to claim 1, wherein a plurality of volume compensation spaces are formed on the circumference of the elastomer spring.

5. The swivel motor according to claim 1, wherein the elastomer spring is an O-ring.

6. The swivel motor according to claim 1, wherein a fastening groove for receiving the elastomer spring has at least one groove side surface extending conically in relation to the center axis of the pressure compensation element.

7. A pressure compensation element comprising:

a dividing element, the dividing element dividing a compensation space into a first and a second compensation space;

a first sleeve that extends substantially perpendicular from the dividing element into the first compensation space, the first sleeve having a first groove at an end opposite the dividing element;

a second sleeve that extends substantially perpendicular from the dividing element into the second compensation space, the second sleeve having a groove at an end opposite the dividing element;

a first spring coupled to the dividing element in the first compensation space, the first spring being surrounded by the first sleeve;

a second spring coupled to the dividing element in the second compensation space, the second spring being surrounded by the second sleeve;

a first elastomer spring housed in the first groove of the first sleeve; and a second elastomer spring housed in the first groove of the second sleeve, wherein the first and second elastomer springs are circular in cross section, each elastomer spring having at least two sections having different diameters.

8. The pressure compensation element of claim 7, wherein the compensation space has a circular cross section.

9. The pressure compensation element of claim 7, wherein the first and second springs are coupled to first and second covers of a motor shaft.

10. A pressure compensation element comprising:

a dividing element, the dividing element dividing a compensation space into a first and a second compensation space;

a first sleeve that extends substantially perpendicular from the dividing element into the first compensation space, the first sleeve having a first groove at an end opposite the dividing element;

a first spring coupled to the dividing element in the first compensation space, the first spring being surrounded by the first sleeve; and a first elastomer spring housed in the first groove of the first sleeve;

wherein the first elastomer spring is circular in cross section, having at least two sections having different diameters.

11. The pressure compensation element according to claim 10, wherein the, compensation space is coupled to a workspace, the work space is formed by:

a cylinder with ribs extending axially at the inner diameter, which cylinder is closed at the ends by two covers; and a motor shaft with vanes having the same axial extension as the ribs of the cylinder, wherein the vanes of the motor shaft and the ribs of the cylinder, together with the cylinder, covers, and motor shaft form the work space.

* * * * *